Aug. 29, 1967 R. A. CLAPP 3,338,654
OPTICAL SYSTEM FOR ROTATING AN IMAGE WITH
RESPECT TO THE OBJECT
Filed July 22, 1963 2 Sheets-Sheet 1

*Roy A. Clapp*
INVENTOR.

Aug. 29, 1967 R. A. CLAPP 3,338,654
OPTICAL SYSTEM FOR ROTATING AN IMAGE WITH
RESPECT TO THE OBJECT
Filed July 22, 1963 2 Sheets-Sheet 2
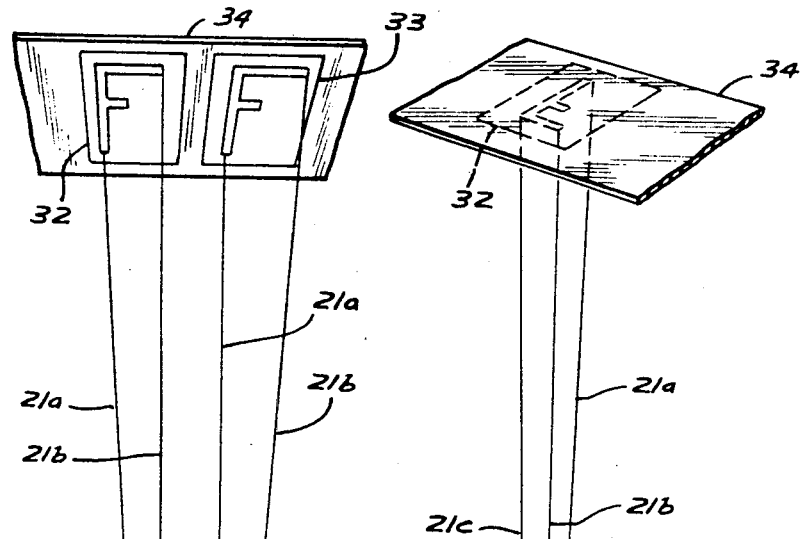
FIG. 6
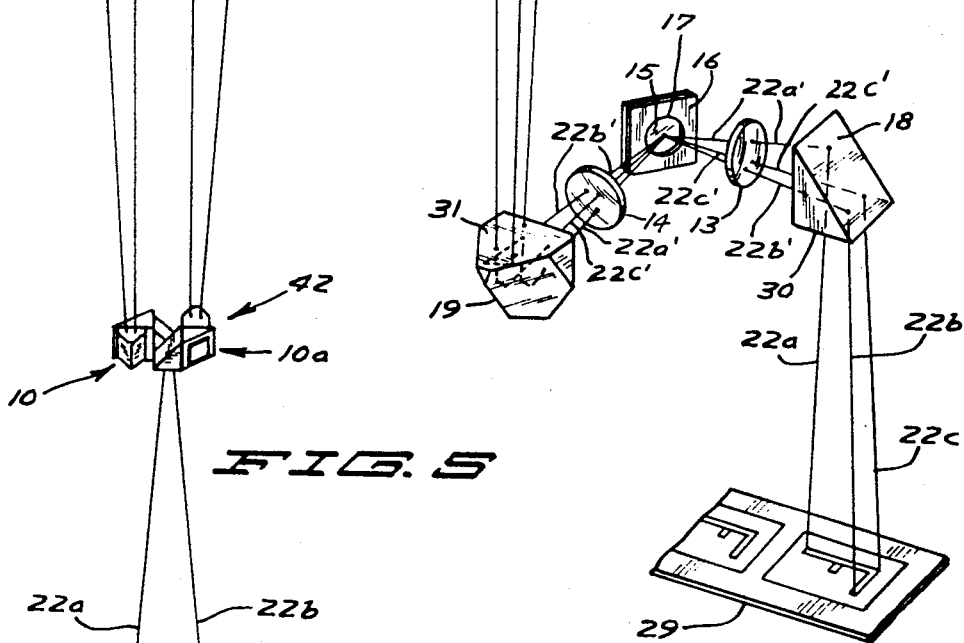
FIG. 5
INVENTOR.
ROY A. CLAPP
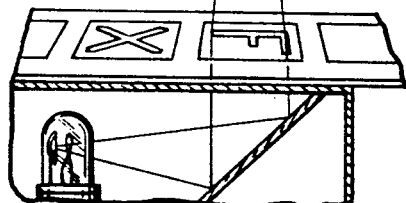
ATTORNEYS — # United States Patent Office 3,338,654
Patented Aug. 29, 1967

3,338,654
OPTICAL SYSTEM FOR ROTATING AN IMAGE
WITH RESPECT TO THE OBJECT
Roy A. Clapp, 10522 Foley Blvd.,
Coon Rapids, Minn. 55433
Filed July 22, 1963, Ser. No. 296,545
2 Claims. (Cl. 350—202)

ABSTRACT OF THE DISCLOSURE

A block with perpendicularly oriented passages contains a mirror. A 45° prism reflects light rays from an object plane through a first lens onto said mirror. The mirror in turn reflects the light rays through a second lens onto an Amici prism where the rays are reflected from angularly disposed reflecting surfaces onto an image plane which is parallel to the object plane.

---

The present invention relates to a rotating objective lens optical system, and refers more specifically to a system in which the image plane and the object plane are parallel to each other while the image is rotated 90° with respect to the object.

While there are many uses for such a system, it is especially adapted for photographic applications. For example, in highly automated photographic printers the negative carrier is adapted to the use of strip film negative, said film being fed from left to right. The images are projected onto a roll of paper of fixed width. Since the negative images are sometimes arranged so that their longer dimensions are lengthwise of the film strip, and whereas others are arranged with their longest dimensions crosswise of the film strip, it is frequently desirable to rotate the images optically in order to orientate the images in the desired way on the sensitized paper.

This optical system is especially valuable for use in automatically programmed package printers wherein prints of different sizes are automatically produced through the use of cluster lenses producing images in groups of 1-up, 2-up, 4-up, 9-up, etc. In such cases, it is a great benefit to be able to rotate the images, such as the 2-up combination, to make full use of the sensitized material.

It is the object of the present invention to provide an optical system which will project an image which is rotated 90° from that ordinarily produced by the usual objective lens system.

A further object of the present invention is to provide such a system which is extremely compact. This allows the use of the system where space is severely restricted, and at the same time, the small size of the components provides minimum mass so that the system can be moved into and out of position rapidly.

Another object of the invention is to provide a system having a configuration that will allow two such systems to be closely juxtaposed with their entrance pupils closely adjacent to one another so that each system views the object from nearly the same viewpoint.

A further object of the invention is to provide a system in which the paraxial rays are displayed sideways in passing through the system so that the projected images of two such systems will lie side by side to each other without overlapping.

A further object of the present invention is to provide an image which is not reverted so that it is not necessary to turn the negative over in order to produce images which are compatible to the image arrangement provided by an ordinary objective lens system.

Another object of this invention is to provide a system in which vignetting is minimal.

A further object of the invention is to provide a rotating system combined with an objective lens in which the rotating elements do not introduce serious adverse aberrations in the final image.

These and other advantages of the present invention will best be understood by reading the following description in conjunction with the accompanying drawings in which:

FIGURE 5 is a perspective view pictorially illustrating two optical systems in a side-by-side relationship to provide rotated images, a letter in this instance serving as the object and also forming the two images resulting therefrom; and FIGURE 6 is a perspective view in exploded form of one of the optical systems illustrated in FIGURE 5.

In the following description, a reference is made to "reflecting elements." These may be mirrors, preferably of the front surface type, or prisms embodying a reflecting surface which is either silvered or operates by virtue of the reflecting surfaces having angles which exceed the critical angle of transmission. In these reflecting elements, the reflecting surface may be a single plane surface or it may have reflecting surfaces in the form of a "roof." An example of the latter type would be the usual Amici prism.

The present invention includes three reflecting elements, one contained within the objective lens itself, and the other two reflecting elements being disposed externally of the objective lens system, one of said reflecting elements being between the lens system and the object plane, whereas the other reflecting element is located between the lens system and the image plane.

Figure 1:
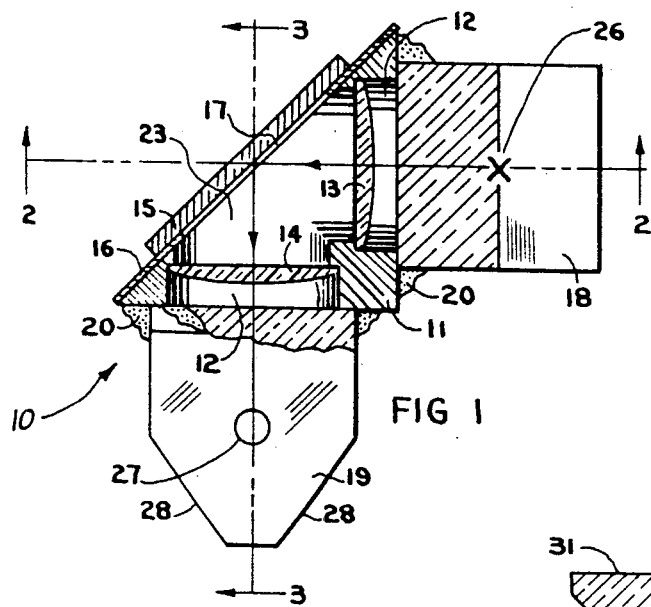
FIGURE 1 is a plan view wherein the internal structure is revealed by a cross section taken along the line 1—1 of FIGURE 2.

Referring now to FIGURE 1, one lens system 10 (there is a second similar system 10a when the optical systems are arranged in a side-by-side relationship as can be discerned from FIGURE 5) comprises two lens components 13 and 14 arranged with their optical axes at right angles to each other and retained in a lens holding block 11 of triangular shape, the hypotenuse face of this block having a first surface mirror 15 positioned 45° to each of the said optical axes. A thin metal plate 16 having an elliptical opening 17 serves as the stop of the system. The block 11 has a cavity 23 formed by boring two holes or passages at right angles to each other, said holes or passages having enlarged diameters 12 forming the seats for the lens components 13 and 14. The cavity 23 permits the passage of light from the lens component 13 to the mirror 15, where it is reflected by the mirror along a path at right angles and then through the lens component 14. The lens components 13 and 14, together with the mirror 15 and metal stop 16, can be conveniently assembled and secured by means of suitable adhesive.

Figure 3:
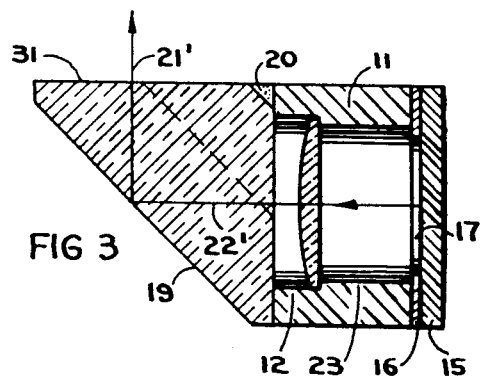
FIGURE 3 is a cross section taken along the plane 3—3 of FIGURE 1.
Figure 2:
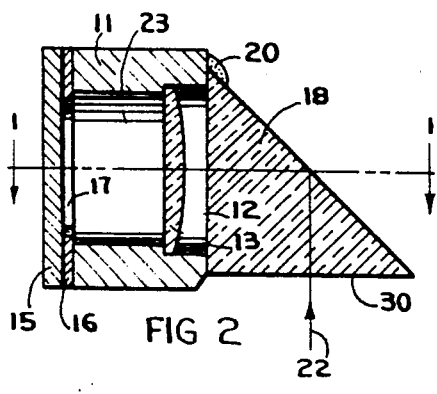
FIGURE 2 is a cross section taken along the plane 2—2 of FIGURE 1.

At each of the counterbored faces of the lens block 11, a reflecting element in the form of a prism is affixed by means of cement 20. One of these, a 45° prism 18, has its entrance face 30 pointing downwardly, as can best be seen in FIGURE 2. This reflects the light ray 22 at right angles and through the lens component 13. Referring again to FIGURE 1, this light ray after reflection at the mirror 15, passes through the second lens component 14 and through the Amici prism 19 which is best seen in FIGURE 3, this light ray being denoted as 22′ before reflection and emerging as 21' through the exit face 31 of the Amici prism 19.

It will be noted that the emergent ray 21' has a path which is displaced sideways from the entering ray 22 and that the paths are parallel to each other.

Referring once more to FIGURE 1, a cross 26 in the center of the prism 18 denotes the location of the entering ray 22 while a circle 27 on the prism 19 denotes the position of the ray 21' leaving the Amici prism. Since the Amici prism 19 has its reflecting surfaces in the form of a roof 28—28, the image is doubly reflected by reason of these two angularly disposed reflecting surfaces so that throughout the complete system the ray is reflected an even number of times, more specifically, four times in this instance. As is well known, this eliminates reversion of the image. So long as the number of reflections are even, it is immaterial which of the reflecting elements are arranged in the form of a roof. It can be explained that the system as described can be arranged equally well with either the 45° prism or the Amici prism facing the object plane and serving as the entrance of the system, as will be clearer when describing FIGURE 6. It will be noticed that the reflecting elements serve to seal off the internal elements so that it is impossible for them to become contaminated after assembly and consequently the entire system can be maintained in a clean condition by merely cleaning the extenal surfaces of the prism referred to.

For the sake of simplicity, the lens components have been shown as simple plano-convex lenses, but in actual practice, suitable compound lenses would be employed to provide the proper corrections.

Since the reflecting element located in the lens system is positioned at the stop, it will be readily seen that the two other reflecting elements will be of minimal size. This is because the bundle of rays required to cover a substantial angular field have their narrowest dimension at the stop position from which they fan out and increase in size. Thus, by dividing external reflecting elements so that one is on each side of the center of the lens, we make use of the smallest portion of these fans.

By assembling all the various components as described heretofore and using an epoxy cement to hold all the elements together, all of the parts are secured to the metal block 11 and no other structure is required for the system. This metal block 11 can be readily secured either by further use of epoxy cement or by providing tapped holes so that the system may be screwed to whatever apparatus requires its use.

Figure 4:
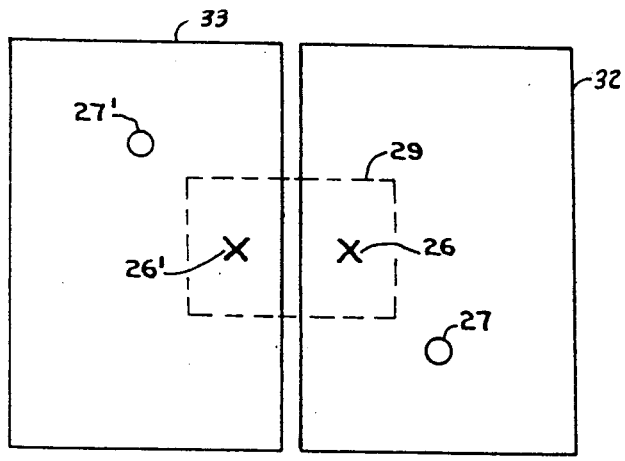
FIGURE 4 is a schematic representation illustrating the way in which two systems according to the present invention may be arranged in a side-by-side relationship to provide two rotated images side by side in the plane of the sensitized material.

To use this invention, the assembly is positioned between the negative and the sensitized material much as the usual objective lens. The entrance face 30 of the prism 18 is directed toward the negative, and the exit face 31 of the prism 19 faces the sensitized material. By adjusting the distance between the negative and the sensitized material and moving the optical assembly spatially therebetween, the image can be focused on the sensitized material in exactly the same way any ordinary objective lens is focused.

Where two images are required, two systems are employed and are mounted in a juxtaposed relationship. The systems have been designated as 10 and 10a in FIGURE 5. FIGURE 4 shows the method of positioning, this figure being quite schematic. The negative, as it appears in FIGURE 4, is indicated by dotted outline and has been given reference numeral 29. At a suitable distance from the negative, the center of one of the entrance prisms denoted by the cross 26 is located and beside it, the center of the other entrance prism is denoted by the cross 26'. For clarity, the optical sytems themselves are omitted from FIGURE 4 but are shown in FIGURE 5. However, the centers of the exit faces of the prisms are denoted by the circles 27 and 27' of the first and second optical systems 10, 10a, respectively.

In a plane parallel to that of the negative 29, still referring to FIGURE 4, and on the opposite side of the optics, the rectangles 32 and 33 represent the two images of the negative.

It will be seen in FIGURE 4 that the cross 26 is directly opposite a point of the negative 29 and that the circle is directly in line with a corresponding point of the image. Since the image is rotated 90° from the negative, these conjugate points are at the right side of the negative and at the bottom of the corresponding image which has been rotated 90° clockwise.

The second optical system 10a acts in a similar fashion, as better understood from an inspection of FIGURE 5, so that the two images appear side by side without overlapping. Although the invention should be understood from FIGURES 1–4 and the accompanying written description pertaining to these figures, FIGURES 5 and 6 have been presented to facilitate a complete comprehension of the invention. As already indicated, FIGURE 5 represents a dual system composed of separate systems 10 and 10a. FIGURE 6 is an exploded perspective view of one of the systems and the tracing of the light ray paths is made easier by employing the letter F as the object on the negative 29. The prism 18 reflects the light rays labeled 22a, 22b and 22c derived from corners of the selected letter at right angles and the rays then traverse paths identified by the reference characters 22a', 22b' and 22c', these rays passing through the lens component 13. The rays then impinge upon the mirror 15 and are then passed through the lens component 14 and then through the Amici prism 19. After emerging from the Amici prism 19, the rays are directed vertically upward and have been designated, respectively, as rays 21a, 21b and 21c. The image plane has been designated by the reference numeral 34 and can be in the form of sensitized material. Thus, the entrance face 30 of the prism 18, as clearly evident from FIGURE 6, is directed toward the negative 29 and the exit face 31 of the prism 19 faces the sensitized material 34. By adjusting the distance between the negative 29 and the sensitized material 34, and moving the optical assembly spatially therebetween, the image can be focused on the sensitized material in exactly the same way any ordinary objective lens is focused.

Whereas three light paths have been pictured in FIGURE 6, only two rays 22a and 22b have been illustrated in FIGURE 5, such a pair being sufficient to illustrate the manner in which the dual optical systems 10 and 10a function. Therefore, only two sets of emerging rays 21a and 21b have been depicted which strike the underside of the object plane 34 of FIGURE 5.

Although the object has been presented in FIGURES 5 and 6 in the form of the letter F, it will be recognized that the negative still carries the reference numeral 29 and the image formed in FIGURE 6 the reference numeral 32, whereas an image 33 in addition to the image 32 is shown in FIGURE 5.

Normally, I prefer to assemble the various components as described heretofore using an epoxy cement to hold the elements together and to form an air-tight seal. The system thus is an integral unit and this can be mounted on a separate base which in turn can be applied to a lens board or other structure within the device wherein it is employed.

I have further found that mounting this sub-base with three adjusting screws, such as are normally used in leveling instruments, the system may be accurately aligned by observing the position of the images while making such adjustments. If desired, these adjustments can then be fixed by means of epoxy resin applied to the adjusting screws.

Having now described my invention and its operation, I claim:

1. A rotating objective lens system adapted to project an image onto one plane from an object lying in another plane, said planes being parallel to and spaced from one another, the system comprising a block having first and second passages therein extending along optical axes at right angles to each other, said passages connecting internally and each having an outwardly facing opening, a mirror carried by said block having a planar reflecting surface positioned at 45 degrees to each of said optical axes, a stop associated with said mirror, first means disposed at the opening of said first passage providing a reflecting surface for receiving light rays from said object plane and to reflect said rays generally at right angles in a direction substantially parallel to said object plane, a first lens component contained in said block between said first means and said mirror through which said rays pass onto the reflecting surface of said mirror, second means disposed at the opening of said second passage providing a reflecting surface for receiving light rays from said mirror and to deflect said rays generally at right angles to said substantially parallel direction along a path substantially parallel to the path extending from said object plane and toward the image plane, and a second lens component contained in said block between said mirror and said second means for directing said rays to said second means, one of said reflecting means being in the form of an Amici prism.

2. A rotating objective lens system in accordance with claim 1 in which said second reflecting means constitutes said Amici prism.

References Cited
UNITED STATES PATENTS

| | | | |
|---|---|---|---|
| 1,339,386 | 5/1920 | Ham | 88—33 |
| 1,746,549 | 2/1930 | Meyers et al. | 88—1 |
| 2,027,675 | 1/1936 | Callier et al. | 88—1 |
| 2,357,390 | 9/1944 | Flint | 88—2.7 |
| 2,418,107 | 3/1947 | Simmon | 88—2.7 |
| 3,200,250 | 8/1965 | Bouwers | 88—1 |

JEWELL H. PEDERSEN, *Primary Examiner.*

R. J. STERN, *Assistant Examiner.*